Nov. 26, 1968    H. F. JOHNSON    3,412,770
PORTABLE PULVERIZER

Filed Dec. 7, 1966    3 Sheets-Sheet 1

INVENTOR.
HURSEL F. JOHNSON,
BY
Berman, Davidson & Berman
ATTORNEYS.

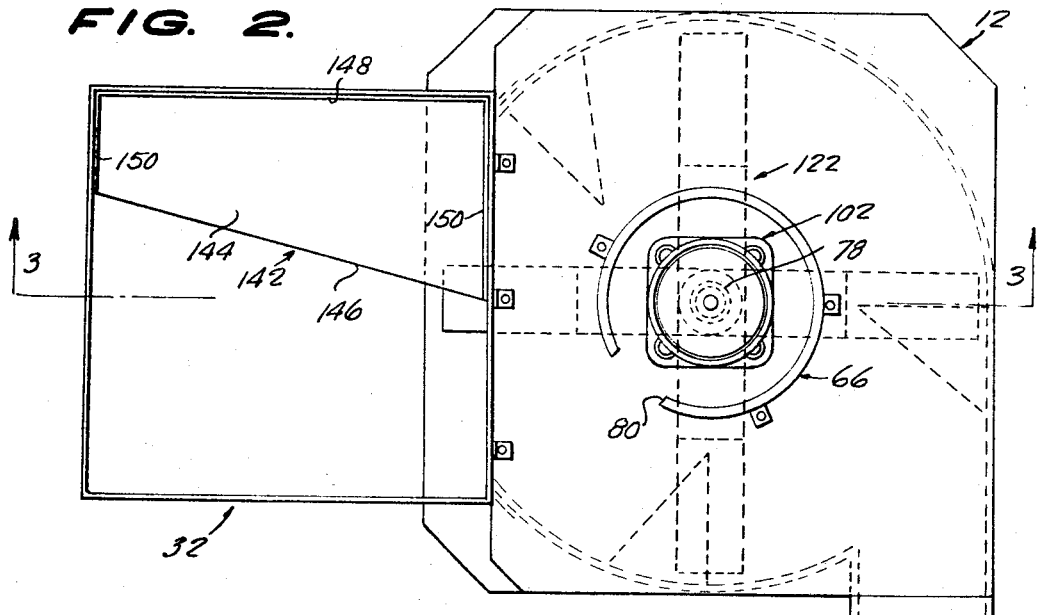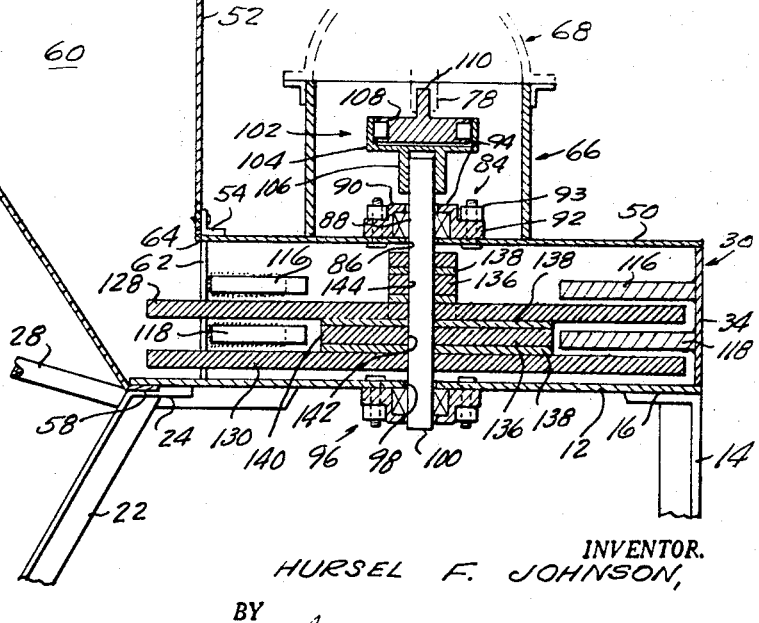

Nov. 26, 1968 H. F. JOHNSON 3,412,770
PORTABLE PULVERIZER

Filed Dec. 7, 1966 3 Sheets-Sheet 3

INVENTOR.
HURSEL F. JOHNSON,
BY
Berman, Sandrik & Berman
ATTORNEYS.

United States Patent Office 3,412,770
Patented Nov. 26, 1968

3,412,770
PORTABLE PULVERIZER
Hursel F. Johnson, 307 Artesia Lane,
Long Beach, Calif. 90805
Filed Dec. 7, 1966, Ser. No. 599,797
10 Claims. (Cl. 146—192)

This invention relates to a portable pulverizer, especially but not exclusively, adapted to reduce leaves, twigs, tree branches, vines, shrubs, and the like, to garden mulching material, or to a state facilitating the handling and disposal of such debris.

The primary object of the invention is the provision of an efficient, easily used, and easily moved device of the kind indicated, having a wheelbarrow type wheeled frame carrying a loading hopper, a material pulverizing rotor housing, the housing having a centrifugal discharge chute.

Another object of the invention is the provision of a simple and relatively inexpensive device of the character indicated above, which is composed of a small number of uncomplicated and easily assembled components.

In the drawings:

FIGURE 2 is an enlarged top plan view of the device with the motor and the clutch casing cover removed;

FIGURE 3 is a vertical longitudinal section, taken on the line 3—3 of FIGURE 2, the motor being removed, and the cover of the clutch casing being shown in phantom lines;

Figure 1:
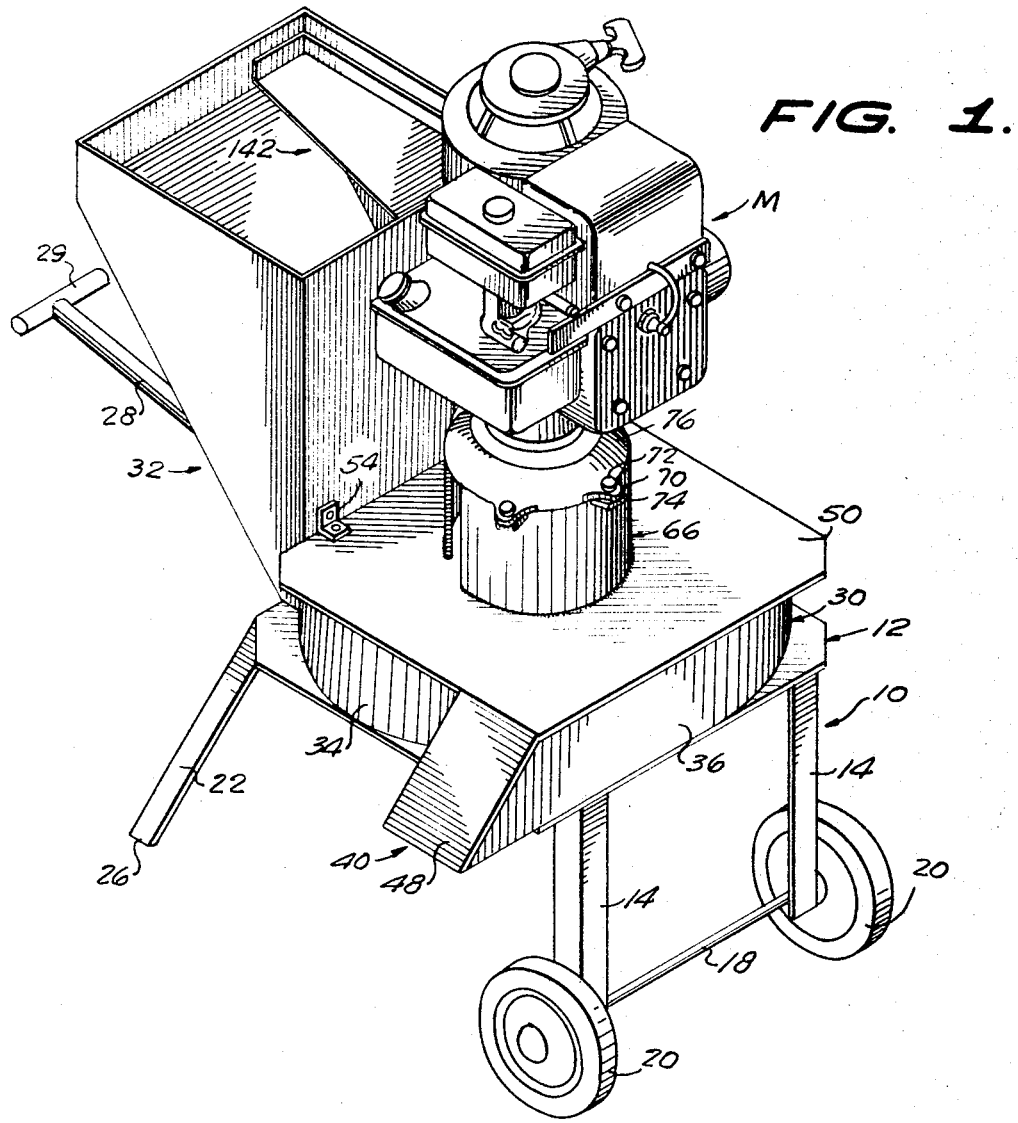
FIGURE 1 is a front perspective view of a device of the invention.

Referring in detail to the drawings, the illustrated device comprising a wheelbarrow type frame 10 composed of a horizontal rectangular plate 12, having perpendicular angle iron front legs 14 affixed, as indicated at 16, to the underside of the plate 12, at the forward corners thereof. An axle 18 extends between the legs 14, at their lower ends, and carries ground-engaging wheels 20, at the outer sides of the legs.

Rearwardly and downwardly angled rear legs 22, are affixed, as indicated at 24, to the underside of the plate 12, at the rear corners thereof, the rear legs 22 having angled, horizontal lower ends 26, adapted to rest upon the ground. A centered longitudinal handle bar 28, is suitably fixed, at its forward end, to the underside of the plate 12, and has a cross bar 29, on its rear end. The handle bar 28 is disposed at a slight upward and rearward angle, relative to the plate 12, as indicated in FIGURE 3.

The horizontal plate 12 forms a common bottom wall, for a rotor housing 30 and a feeding hopper 32. The rotor housing 30 comprises an upstanding perpendicular side wall 34, which is circular, except for a flat straight tangential forward portion 36. The tangential portion 36 extends beyond the related side of the plate 12, so as to serve as one wall 38, of a discharge chute 40, the other parallel wall of the chute being provided by a chordal wall portion 42, extending from a break in the sidewall 34. The wall portions 38 and 42 have downwardly and outwardly angled outer edges 44 and 46, respectively, to which is suitably fixed a top wall 48. A generally rectangular top wall 50, shorter than the plate 12, is suitably fixed on the upper edge of the housing side wall 34.

The hopper 32 comprises a perpendicular front wall 52, rising from the rear edge of the top wall 50, and braced relative thereto, as by means of angle irons 54, affixed to the outer surfaces of the wall 52 and the top wall 50. The hopper further comprises a rearwardly and upwardly angled rear wall 56, affixed at its lower end, as indicated at 58, to the underside of the plate 12, at the rear end thereof; and parallel perpendicular side walls 60, extending between and suitably secured to the front wall 52, the rear wall 56, and the plate 12. A gap 62, in the rotor housing side wall 34, registered with the opening 64, at the lower forward corner of the hopper 32 which communicates with the interior of the housing 30.

An upstanding circular tubular clutch casing 66 is suitably fixed, at its lower end, centrally upon the housing top wall 50, and has, enclosing the upper end thereof, a dome-shaped cover 68, having circumferentially spaced radial ears 70, through which extend bolts 72, which extend through similar ears 74, on the casing 66. The top wall 76, of the cover 68, is similarly formed to securably support thereon, a suitable motor M, such as a miniature gasoline motor, having a pendant perpendicular drive shaft 78, extending downwardly and concentrically in the clutch casing 66. A gap 80, is provided in the casing side wall 82.

An upper antifriction bearing assembly 84, on the rotor housing top wall 50, surrounds an opening 86, provided in the top wall. The assembly 84 can comprise an annular bearing 88, resting directly upon the top wall 50, and held down in place by an annular fitting 90, having an outer lateral flange 92 secured to the top wall, by bolts 93, and an inner flange 94 overlying the bearing 88.

A lower antifriction bearing assembly 96, similar to but reversed with respect to the upper bearing assembly 84, is secured to the underside of the plate 12, around an opening 98, provided therein, and related ends of a perpendicular rotor shaft 100 are journalled in related bearings.

An overriding clutch 102, such as a centrifugal clutch, has a cup-shaped driven member 104, having a pendant sleeve 106, fixed upon the upper end of the rotor shaft 100, and a drive member 108, engaged in the driven member. The drive member 108 has an upstanding shaft 110, suitably fixed to the lower end of the motor shaft 78.

Figure 5:
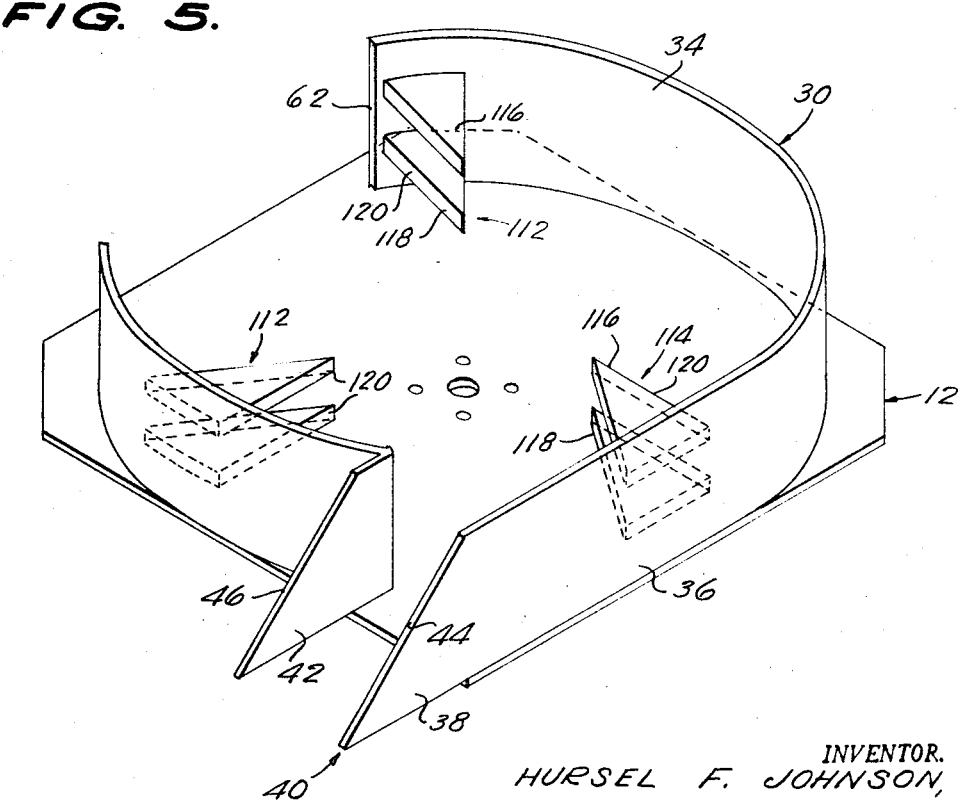
FIGURE 5 is a schematic perspective view of the motor housing, showing the fixed pulverizing blades therein, the top wall of the housing being removed.

As shown in FIGURE 5, the side wall 34 of the rotor housing 30, has fixed thereto, at least three circumferentially spaced pairs of material pulverizing blades, including rear pairs 112, disposed adjacent to related ends of the gap 62 in the side wall 34, and a centered forward pair 114, located on the tangential forward portion 36 of the side wall 34. Each blade pair is composed of an upper blade 116 and a lower blade 118, these blades being of substantially isosceles triangular shape and being registered with each other and parallel spaced from each other at similar vertical intervals. These blades have straight leading edges 120.

As shown in FIGURE 3, the lower fixed blades 118 are spaced upwardly from the bottom wall or plate 12, of the housing 30, and the upper blades 116 are spaced upwardly from the lower blades at similar distances.

Figure 4:
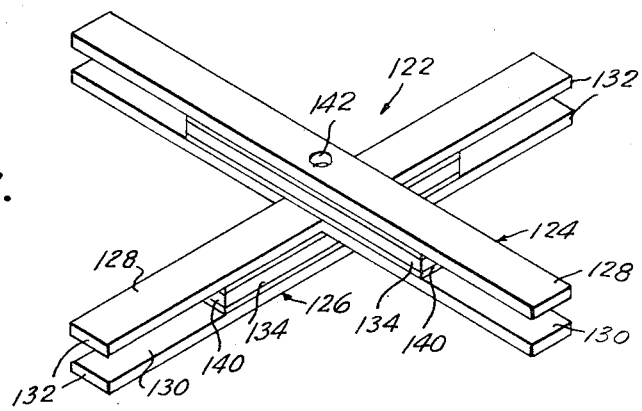
FIGURE 4 is a perspective view of the pulversing rotor.

A rotor 122, fixed on the rotor shaft 100, cooperates with the pairs of fixed blades. As shown in FIGURES 3 and 4, the rotor 122 is cruciform and is composed of fixed and vertically upper and lower similar blade assemblies 124 and 126, respectively, of elongated rectangular shape.

Each of the rotor blade assemblies comprises a pair of similar and registered and parallel spaced, flat rectangular upper and lower plates 128, 130, of a thickness and arrangement to run close to related facing surfaces of the fixed blades and the plate 12, the plates 218, 130 having straight end edges 132, which run close to the rotor housing side wall 34.

The plates 128, 130 are spaced and connected together by separators 134, which are of the same width as and are registered with the plates. Each separator 134 is composed of a middle plate 136, of the same thickness as the plates 128, 130, and outer plates 138 which are relatively thin, and intervene between the middle plates and the plates 128, 130. The separators 134 are substantially shorter than the plates 128, 130, and have squared ends 140, which run close to the related ones of the fixed blades on the rotor housing side wall 34. Aligned openings 142 and 144 are formed in the plates 128, 130, and the separators 134, through which the rotor shaft 100 securably extends. As shown in FIGURE 4, the lower plate 130 of the upper assembly 124 is located in the same plane as the upper plate 128 of the lower assembly 126.

With the above arrangement of the blade assemblies 124 and 126, the lower plates of the lower assembly work in the spaces between the plate 12 and the lower fixed blades, the upper plate of the lower assembly works in the space between the lower fixed blades 118 and the upper fixed blades 116. The lower plates 130 of the upper assembly 124 work in the spaces between the upper and lower fixed blades, and the upper plates of the upper assembly work in the spaces between the upper fixed blades 116 and the housing top wall 50.

For facilitating feeding of material into the open top of the hopper 32, one side wall thereof is provided, at the upper end thereof, with a feed tray 142. The tray 142 is composed of a flat bottom wall 144, having an inner edge 146 which is rearwardly and laterally outwardly angled, and is spaced from the other hopper side wall, at a distance less than half of the width of the hopper. The tray bottom wall 144 slants, at a small downward and inward angle, from the said other hopper side wall, and is located on a level adjacent to and spaced below the top of the hopper, the bottom wall having an upstanding side flange 148, and upstanding end flanges 150, suitably secured to one hopper side wall and to the front and rear walls 52 and 56, respectively, of the hopper. Material to be pulverized is adapted to be placed upon the tray 142, so as to slide gravitationally therefrom into the hopper, and be acted upon by the rotor 122, which, as shown in FIGURE 3, extends into the bottom of the hopper.

In use and operation, the motor M being actuated, so as to turn the rotor 122 clockwise, within the housing 30, material present in the hopper 32 is thrown around the hopper side wall 34, toward the discharge chute 40, by the rotation of the rotor. As the rotor blade assemblies approach the fixed blade assemblies, and pass therebetween, the material is smashed and sheared, and thrown against the rotor housing side wall 34, so that the material is disintegrated and pulverized, and is then centrifugally thrown out of the discharge chute 40, either onto the ground, or into a bag or other container positioned beneath the chute.

What is claimed is:

1. A device of the character described, comprising a horizontal rotor housing, said housing having top and bottom walls, and a side wall extending between said top and bottom walls, said side wall being circular for a major portion of its length, said side wall being formed with tangential portions, said tangential portions having end portions extending beyond said bottom wall and defining a discharge chute, a vertical axis rotor disposed within said housing and concentric with the circular part of said side wall, said rotor comprising crossed and intersecting blade assemblies, each of said assemblies comprising vertically spaced plates, said plates having ends running close to said side wall, and vertically spaced horizontal fixed blades on the said side wall and extending inwardly therefrom, said fixed blades being interdigitated with the plates of the blade assemblies, means journalling the rotor in the housing, and means for rotating the rotor in a direction toward said chute.

2. A device according to claim 1, wherein said motor has a vertical shaft traversing said top and bottom walls, said journalling means comprising bearings mounted on the top and bottom walls.

3. A device according to claim 1, wherein said motor has a vertical shaft traversing said top and bottom walls, said journalling means comprising bearings mounted on the top and bottom walls, said rotating means comprising an upstanding tubular clutch casing fixed upon said top wall around the rotor shaft, a motor mounted upon said casing and having a drive shaft extending centrally into the casing, and self-acting clutch means operatively connecting the motor drive shaft to the rotor shaft.

4. A device according to claim 1, wherein said fixed blades are spaced upwardly from the bottom wall of the housing and from the top wall of the housing, the plates of the rotor blade assemblies being positioned in the spaces between the bottom wall and adjacent fixed blades, and in the spaces between the top wall of the housing and adjacent fixed blades.

5. A device according to claim 1, wherein said fixed blades are spaced upwardly from the bottom wall of the housing and from the top wall of the housing, the plates of the rotor blade assemblies being positioned in the spaces between the bottom wall and adjacent fixed blades, and in the spaces between the top wall of the housing and adjacent fixed blades, said plates of the rotor blade assemblies being of elongated rectangular shape, the ends of the plates being squared, and the fixed blades being of triangular shape.

6. A device according to claim 1, wherein said fixed blades are spaced upwardly from the bottom wall of the housing and from the top wall of the housing, the plates of the rotor blade assemblies being positioned in the spaces between the bottom wall and adjacent fixed blades, and in the spaces between the top wall of the housing and adjacent fixed blades, said plates of the rotor blade assemblies being of elongated rectangular shape, the ends of the plates being squared, and the fixed blades being of triangular shape, said fixed blades having straight leading edges, said leading edges being disposed at acute reentrant angles to the housing side wall.

7. A device according to claim 1, wherein a wheelbarrow type of frame supports the rotor housing, the bottom wall of the rotor housing being a component of said frame, front legs extending downwardly from said plate, ground-engaging wheels journalled on said front legs, rear legs extending downwardly from said plate for contact with the ground, and rearwardly extending handle means on said plate.

8. A device according to claim 1, wherein a wheelbarrow type of frame supports the rotor housing, the bottom wall of the rotor housing being a component of said frame, front legs extending downwardly from said plate, ground-engaging wheels journalled on said front legs, rear legs extending downwardly from said plate for contact with the ground, and rearwardly extending handle means on said plate, a hopper comprising a perpendicular front wall upstanding from said housing top wall, at a location overlying said rear legs, a rear wall rising from said plate and inclined rearwardly relative to said plate, and side walls extending between said front and rear walls, the space between the front and rear walls at their lower ends defining a material feeding opening, said rotor housing side walls having a gap registered with said opening, said rotor reaching into the hopper through said opening and said gap.

9. A device according to claim 1, wherein a wheelbarrow type of frame supports the rotor housing, the bottom wall of the rotor housing being a component of said frame, front legs extending downwardly from said plate, ground-engaging wheels journalled on said front legs, rear legs extending downwardly from said plate for contact with the ground, and rearwardly extending handle means on said plate, a hopper comprising a perpendicular front wall upstanding from said housing top wall, at a location overlying said rear legs, a rear wall rising from said plate and inclined rearwardly relative to said plate, and side wall extending between said front and rear walls, the space between the front and rear walls at their lower ends defining a material feeding opening, said rotor housing side walls having a gap registered with said opening, said rotor reaching into the hopper through said opening and said gap, said hopper having a material feeding tray adjacent the upper end of the hopper and extending laterally inwardly from the side wall thereof and spaced from the other hopper side wall.

10. A device according to claim 1, wherein a wheelbarrow type of frame supports the rotor housing, the bottom wall of the rotor housing being a component of said frame, front legs extending downwardly from said plate, ground-engaging wheels journalled on said front legs, rear legs extending downwardly from said plate for contact with the ground, and rearwardly extending handle means on said plate, a hopper comprising a perpendicular front wall upstanding from said housing top wall, at a location overlying said rear legs, a rear wall rising from said plate and inclined rearwardly relative to said plate, and side wall extending between said front and rear walls, the space between the front and rear walls at their lower ends defining a material feeding opening, said rotor housing side walls having a gap registered with said opening, said rotor reaching into the hopper through said opening and said gap, said hopper having a material feeding tray adjacent the upper end of the hopper and extending laterally inwardly from the side wall thereof and spaced from the other hopper side wall, said tray having a flat bottom wall, said bottom wall declining inwardly and declining in a direction toward the front wall of the hopper.

References Cited

UNITED STATES PATENTS

| | | | |
|---|---|---|---|
| 646,252 | 3/1900 | Andree | 241—190 X |
| 1,037,813 | 9/1912 | Wegerich | 241—257 |
| 2,825,377 | 3/1958 | Ostrowski | 146—192 |
| 3,226,045 | 12/1965 | Shelton et al. | 241—186 X |

ANDREW R. JUHASZ, *Primary Examiner.*

F. T. YOST, *Assistant Examiner.*